United States Patent
Ho et al.

(10) Patent No.: US 10,032,012 B2
(45) Date of Patent: Jul. 24, 2018

(54) STORAGE DEVICE CAPABLE OF FINGERPRINT IDENTIFICATION

(71) Applicant: IMAGE MATCH DESIGN INC., Hsinchu (TW)

(72) Inventors: Cheng-Tao Ho, Hsinchu (TW); Cheng Min Chen, Taipei (TW)

(73) Assignee: IMAGE MATCH DESIGN INC., Hsinchu County (TW)

( * ) Notice: Subject to any disclaimer, the term of this patent is extended or adjusted under 35 U.S.C. 154(b) by 62 days.

(21) Appl. No.: 14/985,366

(22) Filed: Dec. 30, 2015

(65) Prior Publication Data
US 2016/0259927 A1 Sep. 8, 2016

(30) Foreign Application Priority Data
Mar. 4, 2015 (TW) .............................. 104106775 A

(51) Int. Cl.
G06F 21/00 (2013.01)
G06F 21/32 (2013.01)
G06F 21/83 (2013.01)
H04L 29/06 (2006.01)

(52) U.S. Cl.
CPC .............. *G06F 21/32* (2013.01); *G06F 21/83* (2013.01); *H04L 63/0861* (2013.01); *G06F 2221/2107* (2013.01); *H04L 63/0428* (2013.01)

(58) Field of Classification Search
CPC .......... G06F 21/31; G06F 21/10; G06F 21/32; G06F 21/83; G06F 2221/2107; H04L 63/0861; H04L 63/0428
USPC ....................................................... 713/186
See application file for complete search history.

(56) References Cited

U.S. PATENT DOCUMENTS

| 8,880,900 B2 * | 11/2014 | Jang ........................ G06F 21/34 713/189 |
| 2008/0235809 A1 * | 9/2008 | Weinstein ............... G06F 21/78 726/28 |
| 2012/0260349 A1 * | 10/2012 | Nagai ..................... G06F 21/44 726/28 |

(Continued)

FOREIGN PATENT DOCUMENTS

| CN | 1975623 | 6/2007 |
| TW | 200702995 | 1/2007 |
| TW | 201322142 | 6/2013 |

OTHER PUBLICATIONS

Ali, Asha, Liyamol Aliyar, and V. K. Nisha. "RC5 encryption using key derived from fingerprint image." Computational Intelligence and Computing Research (ICCIC), 2010 IEEE International Conference on. IEEE, 2010.*

(Continued)

*Primary Examiner* — Syed Zaidi
(74) *Attorney, Agent, or Firm* — WPAT, P.C., Intellectual Property Attorneys; Anthony King

(57) ABSTRACT

A storage device capable of fingerprint identification includes a first storage, a first controller and a second storage. The first storage is configured to store a registered fingerprint. The first controller is configured to compare the registered fingerprint with an input fingerprint, wherein the input fingerprint is obtained in response to a touch event. The second storage is configured to store a data. The data is, in response to a fingerprint comparison result, selectively allowed to be accessible or prohibited from being accessible to a host.

9 Claims, 8 Drawing Sheets

(56) References Cited

U.S. PATENT DOCUMENTS

| | | | |
|---|---|---|---|
| 2013/0117566 A1* | 5/2013 | Jang | G06F 21/34 713/168 |
| 2013/0305394 A1* | 11/2013 | Nozue | G06F 21/57 726/30 |
| 2014/0237263 A1* | 8/2014 | Suzuki | G06F 12/1408 713/193 |
| 2014/0270417 A1 | 9/2014 | Lin | |
| 2014/0270418 A1* | 9/2014 | Lin | G06K 9/00053 382/124 |

OTHER PUBLICATIONS

Office Action dated Jan. 21, 2016 for the Taiwanese counterpart application 104106775.
English abstract translation of the Office Action dated Jan. 21, 2016 for the Taiwanese counterpart application 104106775.
English abstract translation of TW 200702995.
English abstract translation of CN 1975623.
English abstract translation of TW 201322142.

* cited by examiner

STORAGE DEVICE CAPABLE OF FINGERPRINT IDENTIFICATION

TECHNICAL FIELD

The present disclosure is generally related to an electronic device and, more particularly, to a storage device capable of fingerprint identification.

BACKGROUND

Nowadays is a generation of information explosion. Data storage media have become more and more popular as the need for storage of information drastically increases. With the rapid development in semiconductor fabrication and communication technology, to satisfy the increasing need of information storage, data storage media are designed in a more compact profile and provide more storage capacity. Apart from the technical advance, data security has been a subject of great interest. To protect data from being accesses by an unauthorized user, some storage devices possess the function of fingerprint identification in order to determine whether a user in front of the storage device is the owner of the storage device. However, such storage devices may be liable to be broken, and thus run the risk that data stored therein are stolen.

SUMMARY

Embodiments of the present disclosure provide a storage device capable of fingerprint identification. The storage device capable of fingerprint identification includes a first storage, a first controller and a second storage. The first storage is configured to store a registered fingerprint. The first controller is configured to compare the registered fingerprint with an input fingerprint, wherein the input fingerprint is obtained in response to a touch event. The second storage is configured to store a data. The data is, in response to a fingerprint comparison result, selectively allowed to be accessible or prohibited from being accessible to a host.

In an embodiment, the second storage is configured to be allowed to provide the data to the host in response to a fingerprint comparison result that the registered fingerprint is identical with the input fingerprint.

In another embodiment, the second storage is configured to be prohibited from providing the data to the host in response to a fingerprint comparison result that the registered fingerprint is not identical with the input fingerprint.

In yet another embodiment, the first storage is configured to store a first key and the second storage is configured to store a second key. The storage device further includes a second controller. The second controller is configured to compare the first key of the first storage with the second key of the second storage and, in response to a key comparison result, to selectively allow the second storage to provide or prohibit the second storage from providing the data to the host.

In still another embodiment, the second controller is configured to allow the second storage to provide the data to the host in response to a key comparison result that the first key is identical with the second key and in response to a fingerprint comparison result that the registered fingerprint is identical with the input fingerprint.

In yet still another embodiment, the second controller is configured to allow the second storage to provide the data to the host in response to a fingerprint comparison result that the registered fingerprint is identical with the input fingerprint.

In a further embodiment, the second controller is configured to prohibit the second storage from providing the data to the host in response to a key comparison result that the first key is not identical with the second key.

In further another embodiment, the second controller is configured to prohibit the second storage from providing the data to the host in response to a fingerprint comparison result that the registered fingerprint is not identical with the input fingerprint.

Some embodiments of the present disclosure provide a method for protecting data. The method includes receiving a fingerprint as a registered fingerprint in a fingerprint registered procedure; obtaining an input fingerprint in response to a touch event; determining whether the obtained input fingerprint is identical with the registered fingerprint by a storage device capable of fingerprint identification; and selectively allowing data stored in a storage of the storage device to be accessible or prohibiting the data from being accessible to a host, which is external to the storage device.

In an embodiment, the second storage is allowed to provide the data to the host when it is determined that the registered fingerprint is identical with the input fingerprint.

In another embodiment, the second storage is prohibited from providing the data to the host when it is determined that the registered fingerprint is not identical with the input fingerprint.

In yet another embodiment, the method further includes storing a first key in a first storage of the storage device; storing a second key in a second storage of the storage device; comparing the first key and the second key by the storage device; and selectively allowing the second storage to provide or prohibiting the second storage from providing the data to the host, in response to a key comparison result.

In still another embodiment, the method further includes comparing the first key and the second key by a second controller of the storage device.

In yet still another embodiment, the method further includes allowing the second storage to provide the data to the host in response to a key comparison result that the first key is identical with the second key, and in response to a fingerprint comparison result that the registered fingerprint is identical with the input fingerprint.

In a further embodiment, the method further includes prohibiting the second storage from providing the data to the host in response to a key comparison result that the first key is not identical with the second key.

In further another embodiment, the method further includes prohibiting the second storage from providing the data to the host in response to a fingerprint comparison result that the registered fingerprint is not identical with the input fingerprint.

In further yet another embodiment, the method further includes providing the registered fingerprint of the first storage to the host; and encrypting a data with the registered fingerprint.

In further yet still another embodiment, the data includes a host data stored in the host.

In yet further another embodiment, the method further includes providing the data stored in the second storage to the host; and encrypting a data with the registered fingerprint.

In still yet further another embodiment, the method further includes encrypting the data stored in the second storage with the registered fingerprint to obtain an encrypted data; and providing the encrypted data to the host.

BRIEF DESCRIPTION OF THE DRAWINGS

Details of one or more embodiments of the disclosure are set forth in the accompanying drawings and the description below. Other features and advantages of the disclosure will be apparent from the description, drawings and claims.

DETAIL DESCRIPTION

Figure 1:
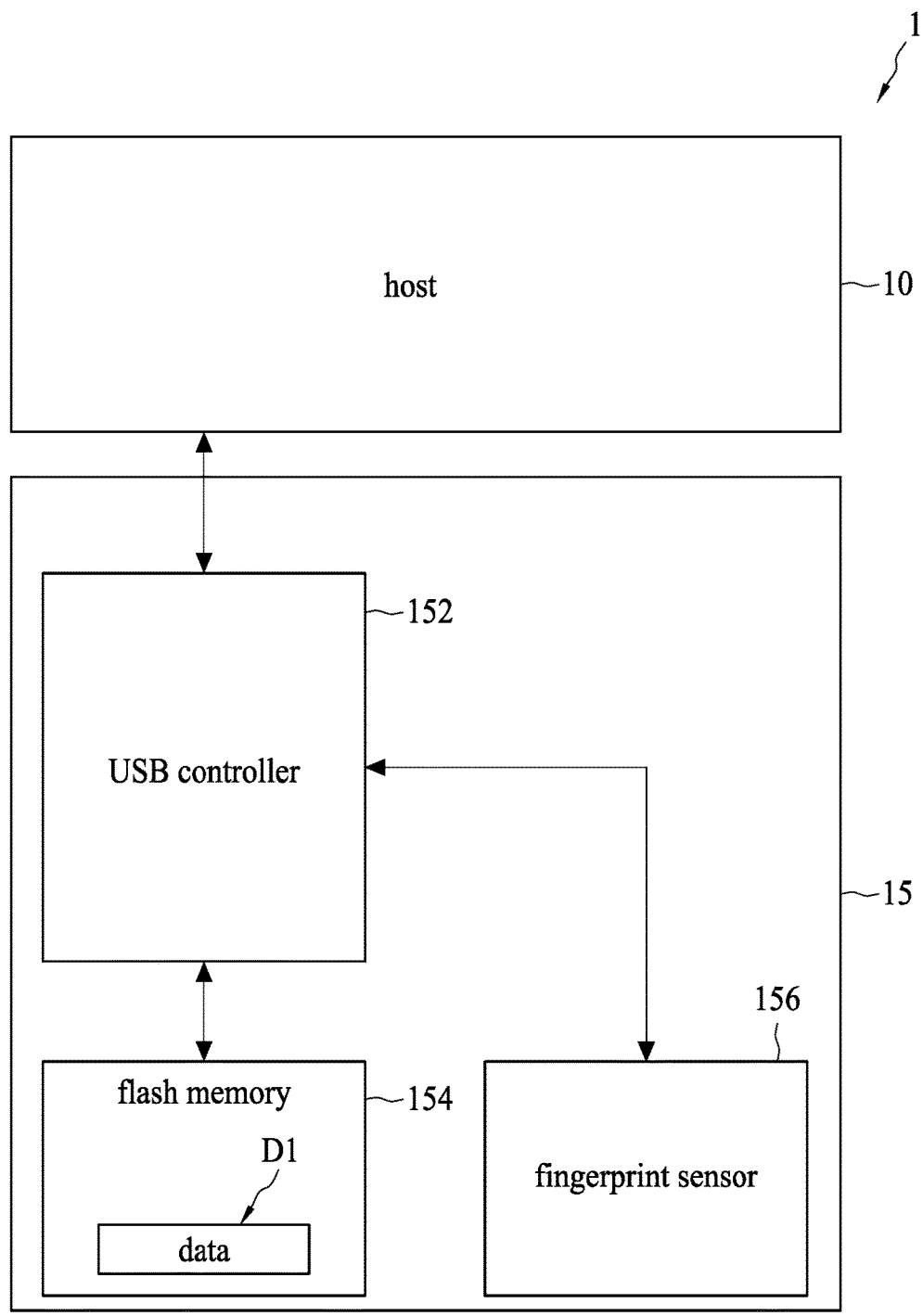
FIG. 1 is a schematic diagram of a data access system in prior art.

Embodiments of the disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Throughout the various views and illustrative embodiments, like reference numerals are used to designate like elements. Reference will now be made in detail to exemplary embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "some embodiments" or "an embodiment" means that a particular feature, structure, or characteristic described in connection with the embodiment is included in at least one embodiment. Thus, the appearances of the phrases "in some embodiments" or "in an embodiment" in various places throughout this specification are not necessarily all referring to the same embodiment. Furthermore, the particular features, structures, or characteristics may be combined in any suitable manner in one or more embodiments.

In the drawings, like reference numbers are used to designate like or similar elements throughout the various views, and illustrative embodiments of the present invention are shown and described. The figures are not necessarily drawn to scale, and in some instances the drawings have been exaggerated and/or simplified in places for illustrative purposes only. A person having ordinary skill in the art will appreciate the many possible applications and variations of the present invention based on the following illustrative embodiments of the present invention.

Unless otherwise defined, all terms (including technical and scientific terms) used herein have the same meaning as commonly understood by a person having ordinary skill in the art to which the embodiments of the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a schematic diagram of a data access system 1 in prior art. The data access system 1 includes a host 10 and a universal serial bus (USB) flash drive 15. The USB flash drive 15 includes a USB controller 152, a flash memory 154 and a fingerprint sensor 156. The flash memory 154 is configured to store data D1.

In operation, the USB flash drive 15 is inserted into the host 10. The host 10 performs a reading operation on the USB flash drive 15. For data security, a user of the data access system 1 is required to perform a fingerprint registration procedure. Specifically, the user puts a finger on the fingerprint sensor 156 for the USB flash drive 15 to obtain a registered fingerprint (a first fingerprint). The USB flash drive 15 then uploads the registered fingerprint to the host 10. The host 10, having stored a second fingerprint of the owner who owns the USB flash drive 15 in advance, determines whether the registered fingerprint is identical with the second fingerprint by, for example, fingerprint identification software installed in the host 10. Accordingly, the host 10 is able to determine whether the user who currently uses the USB flash drive 15 is the owner of the USB flash drive 15.

However, fingerprint identification in the data access system 1 is performed by the host 10. In case the host 10 is attacked by virus or malicious software, or is provided with crack software, the host 10 would inform the USB controller 152 of the USB flash drive 15 that a user who currently uses the USB flash drive 15 is the owner of the USB flash drive 15 even if the user is actually not the owner. Consequently, the data D1 stored in the flash memory 154 can be stolen.

Figure 2:
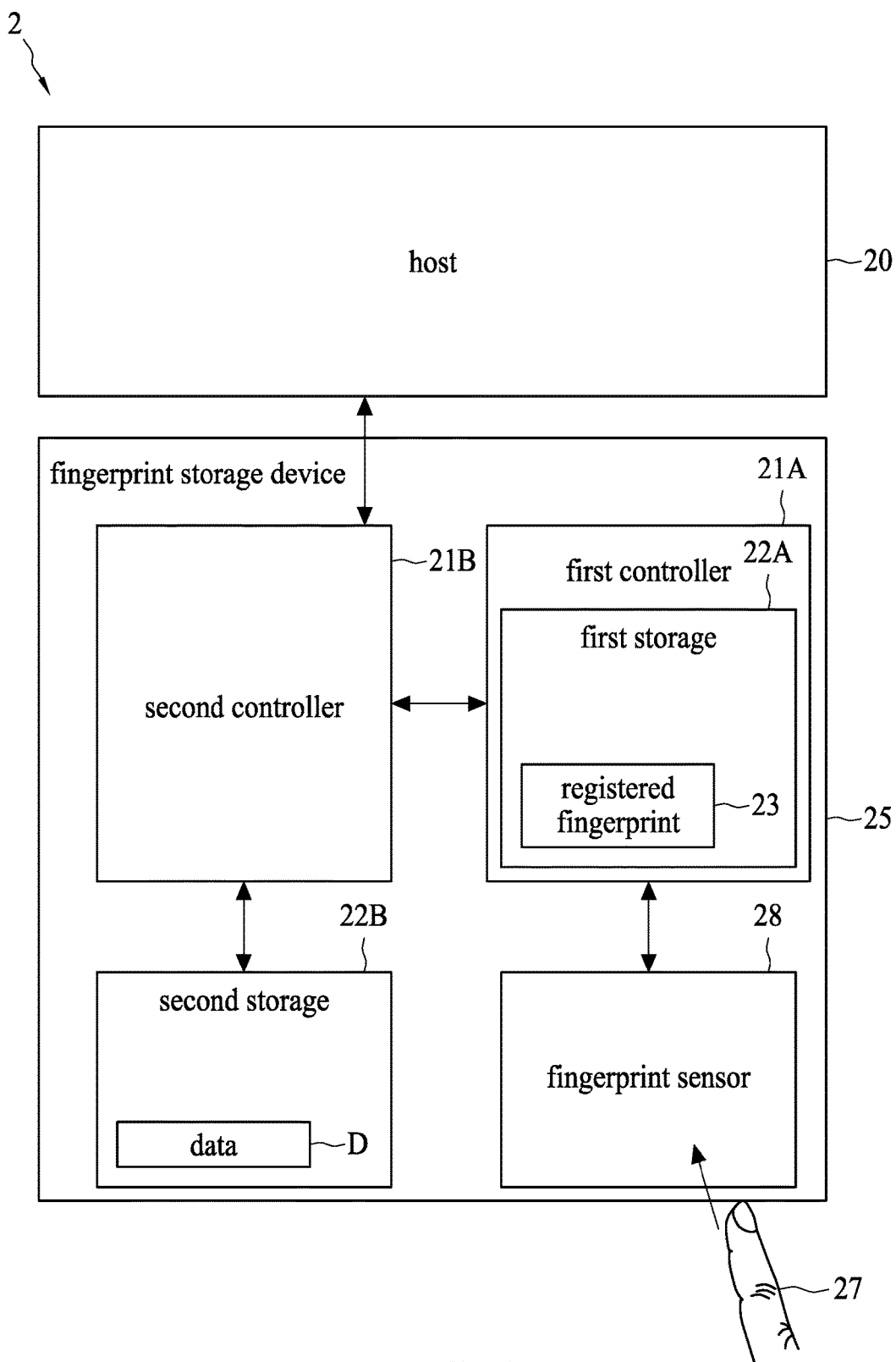
FIG. 2 is a schematic diagram of a data access system, in accordance with an exemplary embodiment of the present disclosure.

FIG. 2 is a schematic diagram of a data access system 2, in accordance with an exemplary embodiment of the present disclosure. Referring to FIG. 2, the data access system 2 includes a storage device 25 capable of fingerprint identification (hereafter "a fingerprint storage device") and a host 20. The fingerprint storage device 25 includes a first controller 21A, a first storage 22A in the first controller 21A, a second controller 21B, a second storage 22B and a fingerprint sensor 28. In some embodiments, the fingerprint storage device 25 includes, but is not limited to, a USB flash drive.

Referring to FIG. 2, the second storage 22B is configured to store a data D to be protected. The data D includes, but is not limited to, at least one of an audio file, an image file or a video file. The second storage 22B includes, but is not limited to, at least one of a flash memory, a programmable read-only memory (PROM), a read-Only memory (ROM), an erasable programmable read only memory (EPROM), a one-time programmable read only memory (OTPROM) or an electrically erasable programmable read only memory (EEPROM).

The fingerprint sensor 28 is configured to, in response to a touch event at the fingerprint sensor 28, sense a fingerprint of a finger 27 of a user so as to obtain a fingerprint image.

The first controller 21A, coupled to the fingerprint sensor 28, is configured to perform a fingerprint registration procedure and a fingerprint comparison procedure, which will be described in detail below. The first storage 22A of the first controller 21A is configured to store a registered fingerprint, which is obtained through the fingerprint registration procedure. In some embodiments, the first storage 22A may store a plurality of registered fingerprints. For illustration, only one registered fingerprint 23 is shown in FIG. 2. In some embodiments, the registered fingerprints include a first registered fingerprint (such as the registered fingerprint 23), a second registered fingerprint (not shown) and a third registered fingerprint (not shown). In some embodiments, the first registered fingerprint relates to a first user's fingerprint, the second registered fingerprint relates to a second user's fingerprint, and the third registered fingerprint relates to a third user's fingerprint. In some embodiments, the first registered fingerprint relates to a first finger of a user, the second registered fingerprint relates to a second finger of the user, and the third registered fingerprint relates to a third finger of the user.

In the present embodiment, the first storage 22A is independent of or separate from the second storage 22B. However, in some embodiments, the first storage 22A and the second storage 22B are integrated into a single storage device.

In an embodiment, the first controller 21A may include a third storage (not shown) different from the first storage 22A. The third storage is configured to store fingerprints, which are sensed by the fingerprint sensor 28 through a fingerprint comparison procedure. In another embodiment, the first storage 22A is configured to store fingerprints, which are sensed by the fingerprint sensor 28 through a fingerprint comparison procedure.

The second controller 21B, coupled to the first controller 21A, is configured to control operation for an access to the second storage 22B. For example, the second controller 21B can prohibit the data D in the second storage 22B from being accessible or allow the data D to be accessible to the host 20, which will be described in detail below. In some embodiments, the second controller 21B includes, but is not limited to, a USB controller.

In the present embodiment, the second controller 21B is independent of the first controller 21A. However, in some embodiments, the second controller 21B and the first controller 21A are integrated into a single controller.

In operation, the first storage 22A may initially store no fingerprints. In an embodiment, as the fingerprint storage device 25 is connected to the host 20, the host 20 commands the first controller 21A to start performing a fingerprint registration procedure. In another embodiment, the fingerprint registration procedure can be activated by way of touching a button or a suitable tool on the fingerprint storage device 25 without any commands from the host 20.

The fingerprint registration procedure includes, for example, putting a finger 27 on the fingerprint sensor 28, sensing an image of the finger 27 by the fingerprint sensor 28 to obtain a registered fingerprint 23, and transmitting the obtained registered fingerprint 23 to the first storage 22A.

In some embodiments, when the first storage 22A has stored a registered fingerprint, no fingerprint registration procedures can be performed. In that case, to register a new fingerprint by performing a fingerprint registration procedure, a verification procedure is required. Moreover, such fingerprint registration procedure cannot be performed unless the verification is passed. In this way, the situation that a third party may otherwise register his fingerprint with the fingerprint storage device 25 can be avoided, and thus the data D can be protected from being stolen by an unauthorized third party.

To access the data D in the fingerprint storage device 25, the fingerprint storage device 25 is coupled to the host 20. A fingerprint verification procedure is performed before reading the data D under protection. The fingerprint verification procedure includes, for example, putting finger 27 on the fingerprint sensor 28, sensing an image of the finger 27 by the fingerprint sensor 28 to obtain an input fingerprint, and providing the input fingerprint to the first controller 21A. The first controller 21A then performs a fingerprint comparison procedure. The fingerprint comparison procedure includes, for example, comparing the registered fingerprint 23 with the input fingerprint by the first controller 21A, and transmitting a result of the fingerprint comparison from the first controller 21A to the second controller 21B.

The second controller 21B, in response to the fingerprint comparison result, allows the second storage 22B to provide the data D to the host 20, or prohibits the second storage 22B from providing the data D to the host 20. Specifically, when the registered fingerprint 23 is identical with the input fingerprint, the second storage 22B is allowed to provide the data D to the host 20. In contrast, when the registered fingerprint 23 is not identical with the input fingerprint, the second storage 22B is prohibited from providing the data D to the host 20.

Since the fingerprint comparison procedure is not performed at the host 20, and the fingerprint comparison result is not provided by the host 20, the risk of using a fake instruction to access the data D through the host 20 can be avoided. For example, in the situation where the registered fingerprint 23 in fact is not identical with the input fingerprint, a malicious third party may issue a fake instruction through the host 20, indicating that the registered fingerprint 23 is identical with the input fingerprint. Alternatively, in the situation where the host 20 in fact does not perform a fingerprint comparison procedure, a malicious third party may still issue a fake instruction through the host 20, indicating that the registered fingerprint 23 is identical with the input fingerprint. As a result, compared with the USB flash drive 15 illustrated and described with reference to FIG. 1, the fingerprint storage device 25 of the invention provides better data security.

Figure 3:
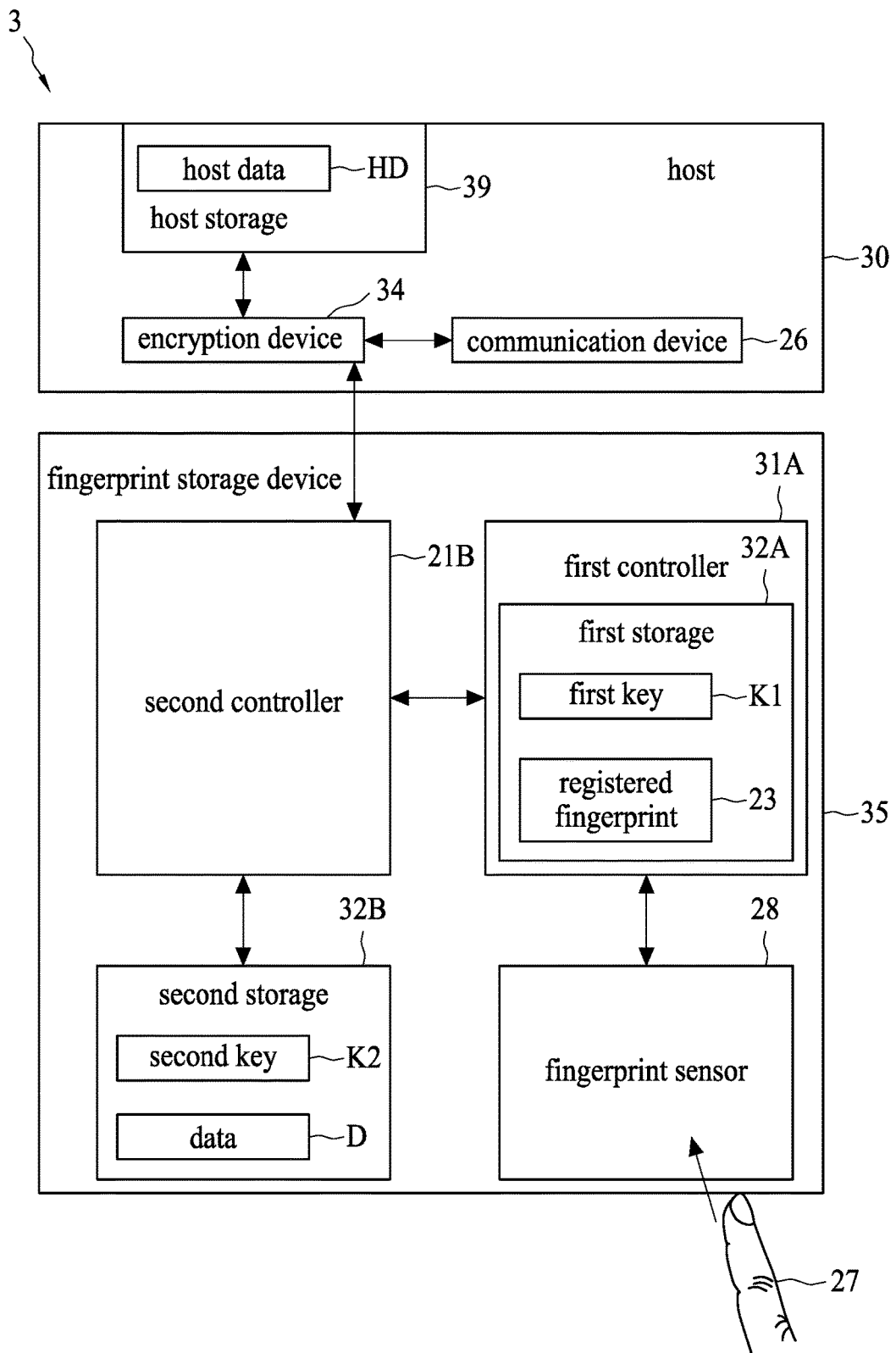
FIG. 3 is a schematic diagram of a data access system, in accordance with an exemplary embodiment of the present disclosure.

FIG. 3 is a schematic diagram of a data access system 3, in accordance with an exemplary embodiment of the present disclosure. Referring to FIG. 3, the data access system 3 includes a fingerprint storage device 35 and a host 30.

The host 30 is similar to the host 20 described and illustrated with reference to FIG. 2 except that, for example, the host 30 further includes an encryption device 34, a communication device 36 and a host storage device 39. The encryption device 34 is configured to perform an encryption operation, which will be described in detail below. The communication device 36 is coupled to the encryption device 34, and is configured to share data over an internet (such as the Internet 42 shown in FIG. 4). The host storage device 39 is coupled to the encryption device 34, and is configured to store a host data HD. The host data HD includes, but is not limited to, an audio file, an image file or a video file.

The fingerprint storage device 35 is similar to the fingerprint storage device 25 described and illustrated with reference to FIG. 2 except that, for example, the fingerprint storage device 35 includes a first controller 31A and a second storage device 32B. Further, the first controller 31A includes a first storage 32A.

The first storage 32A is similar to the first storage 22A described and illustrated with reference to FIG. 2 except that, for example, the first storage 32A further stores a first key K1. In an embodiment, a designer of the fingerprint storage device 35 has written the first key K1 into the first storage 32A in advance.

The second storage 32B is similar to the second storage 22B described and illustrated with reference to FIG. 2 except that, for example, the second storage 32B further stores a second key K2. In an embodiment, a designer of the fingerprint storage device 35 has written the second key K2 into the second storage 32B in advance. In some embodiments, the first key K1 and the second key K2 are encrypted and calculated using the secure hash algorithm.

The fingerprint storage device 35 may also perform a fingerprint registration procedure and a fingerprint comparison procedure, like the fingerprint storage device 25 described and illustrated with reference to FIG. 2. Moreover, the fingerprint storage device 35 may perform a key comparison procedure in the second controller 21B. The key comparison procedure includes, for example, comparing the first key K1 stored in the first storage 32A of the first controller 31A with the second key K2 stored in the second storage 32B. Further, the second controller 21B calculates the first key K1 and the second key K2 according to an algorithm. The calculation result indicates whether the first key K1 is identical with the second key K2.

Moreover, the second controller 21B, in response to both the fingerprint comparison result and the key comparison result, allows the second storage 32B to provide the data D to the host 30, or prohibits the second storage 32B from providing the data D to the host 30.

In some embodiments, when the key comparison result indicates that the first key K1 is identical with the second key K2, and the fingerprint comparison result indicates that the registered fingerprint 32 is identical with the input fingerprint, the second controller 21B allows the second storage 32B to provide the data D to the host 30.

In some embodiments, when the key comparison result indicates that the first key K1 is identical with the second key K2 while the fingerprint comparison result indicates that the registered fingerprint is not identical with the input fingerprint, the second controller 21B prohibits the second storage 32B from providing the data D to the host 30.

In some embodiments, when the fingerprint comparison result indicates that the registered fingerprint is identical with the input fingerprint while the key comparison result indicates that the first key K1 is not identical with the second key K2, the second controller 21B prohibits the second storage 32B from providing the data D to the host 30.

In some embodiments, the fingerprint storage device 35 performs the fingerprint comparison procedure prior to the key comparison procedure. Moreover, the fingerprint storage device 35 performs the key comparison procedure to determine whether the first key K1 is identical with the second key K2 only if the fingerprint comparison result indicates that the registered fingerprint 32 is identical with the input fingerprint. If the fingerprint comparison result indicates that the registered fingerprint 32 is not identical with the input fingerprint, the second controller 21B prohibits the second storage 32B from providing the data D to the host 30. Therefore, there is no need for the fingerprint storage device 35 to perform the key comparison procedure to determine whether the first key K1 is identical with the second key K2.

In some embodiments, the fingerprint storage device 35 performs the key comparison procedure prior to the fingerprint comparison procedure. Moreover, the fingerprint storage device 35 performs the fingerprint comparison procedure to determine whether the registered fingerprint 32 is identical with the input fingerprint only if the key comparison result indicates that the first key K1 is identical with the second key K2. If the key comparison result indicates that the first key K1 is not identical with the second key K2, the second controller 21B prohibits the second storage 32B from providing the data D to the host 30. Therefore, there is no need for the fingerprint storage device 35 to perform the fingerprint comparison procedure to determine whether the registered fingerprint 32 is identical with the input fingerprint.

In some embodiments, the fingerprint storage device 35 performs the key comparison procedure and the fingerprint comparison procedure simultaneously.

In some embodiments, both the second key K2 and the data D are stored in a same storage, such as the second storage 32B. In this way, the fingerprint storage device 35 can be protected from being broken by a hardware approach that aims to steal the data D. Specifically, a first key in a fingerprint storage device is different from that in another fingerprint storage device. Likewise, a second key in a fingerprint storage device is different from that in another fingerprint storage device. However, a first key and a second key in a same fingerprint storage device match each other. Therefore, if a second storage of a first fingerprint storage device is detached from the first fingerprint storage device, and the detached second storage is attached to a second fingerprint storage device, data stored in the second storage cannot be accessible in the second fingerprint storage device because the second key stored in the second storage of the first fingerprint storage device is different from an original second key stored in the second fingerprint storage device. As a result, when performing a key comparison procedure, the second fingerprint storage device determines that the second key stored in the second storage of the first fingerprint storage device mismatch a first key stored in a first storage of the second fingerprint storage device. Accordingly, the data stored in the second storage is prohibited from being accessible to the host. Effectively, the data stored in the second storage can be prevented from being stolen by a hardware approach. Moreover, since no fingerprint comparison procedure is performed in the host 30, the fingerprint storage device 35 can be protected from being broken by a software approach that aims to steal the data. Compared with the USB flash drive 15 described and illustrated with reference to FIG. 1, the fingerprint storage device 35 of the invention provides better data security.

Figure 4:
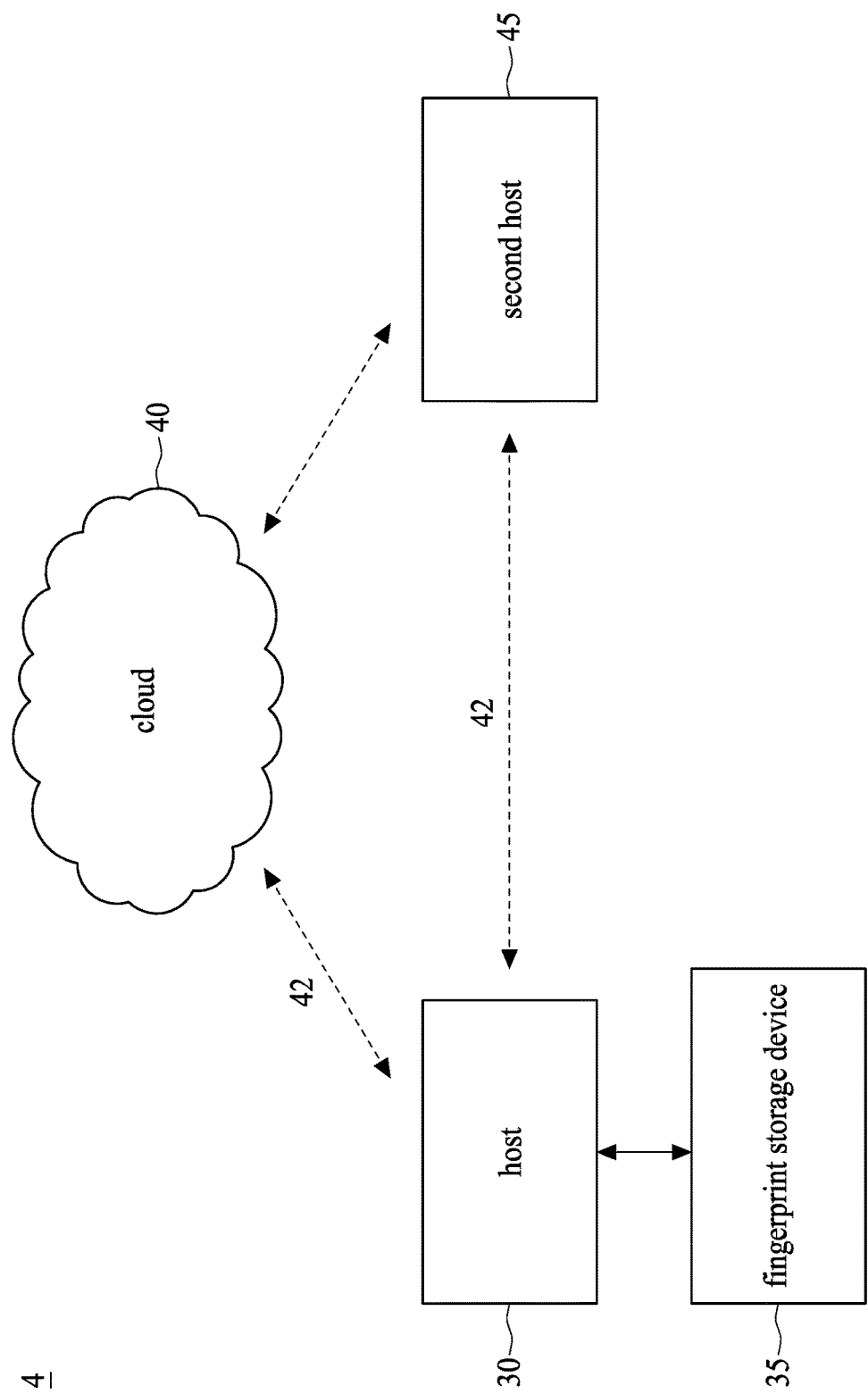
FIG. 4 is a block diagram of a communication system, in accordance with an exemplary embodiment of the present disclosure.

FIG. 4 is a block diagram of a communication system 4, in accordance with an exemplary embodiment of the present disclosure. Referring to FIG. 4, the communication system 4 includes a second host 45, in addition to the host 30 which now serves as a first host and the fingerprint storage device 35 described and illustrated with reference to FIG. 3.

In some embodiments, the fingerprint storage device 35 provides a registered fingerprint 23 stored in the first storage 32A to the host 30 if a fingerprint comparison result of the fingerprint storage device 35 indicates that the registered fingerprint 23 is identical with an input fingerprint.

Further, in an embodiment, the fingerprint storage device 35 stores a plurality of registered fingerprints. The fingerprint storage device 35 provides one of the plurality of registered fingerprints, which is identical with an input fingerprint, to the host 30 if a fingerprint comparison result of the fingerprint storage device 35 indicates that the one of the plurality of registered fingerprints, such as the registered fingerprint 23, is identical with the input fingerprint.

In some embodiments, the fingerprint storage device 35 provides the registered fingerprint 23 stored in the first storage 32A to the host 30 only if the fingerprint comparison result of the fingerprint storage device 35 indicates that the registered fingerprint 23 is identical with the input fingerprint and the key comparison result of the fingerprint storage device 35 indicates that the first key K1 is identical with the second key K2.

Further, in an embodiment, the fingerprint storage device 35 stores a plurality of registered fingerprints. The fingerprint storage device 35 provides one of the plurality of registered fingerprints, which is identical with an input fingerprint, to the host 30 if a fingerprint comparison result of the fingerprint storage device 35 indicates that the one of the plurality of registered fingerprints, such as the registered fingerprint 23, is identical with the input fingerprint, and a key comparison result of the fingerprint storage device 35 indicates that the first key K1 is identical with the second key K2.

The encryption device 34 of the host 30 encrypts the host data HD with the registered fingerprint 23 from the fingerprint storage device 35, and thereby generates an encrypted host data HD. The communication device 36 of the host 30 provides the encrypted host data HD to the second host 45 over the Internet 42, and uploads the same over the Internet 42 to a cloud 40. In an embodiment, the host 30, the second host 45 and the cloud 40 are installed with software, such as Dropbox. The software enables the host 30, the second host 45 and the cloud 40 to synchronize and share data with each other. By performing the software, the host 30 can set up a data sharing status of a document such that the document can be shared with the second host 45 and the cloud 40, and can be synchronized with the second host 45 and the cloud 40. When a user puts the encrypted host data HD in that document, the second host 45 and the cloud 40 are able to simultaneously obtain the encrypted host data HD. Since the host data HD obtained by the second host 45 and the cloud 40 has been encrypted, a malicious third party is unable to view the content of the encrypted host data HD at the second host 45 or the cloud 40.

In some embodiments, the fingerprint storage device 35 not only provides the registered fingerprint 23 to the host 30, but also provides the data D of the fingerprint storage device 35 to the host 30 if the fingerprint comparison result of the fingerprint storage device 35 indicates that the registered fingerprint 23 is identical with the input fingerprint. The host 30 encrypts the data D with the registered fingerprint 23, and provides and uploads the encrypted data D to the second host 45 and the cloud 40, respectively. In a further embodiment, the fingerprint storage device 35 provides the registered fingerprint 23 and the data D to the host 30 if the fingerprint comparison result of the fingerprint storage device 35 indicates that the registered fingerprint 23 is identical with the input fingerprint and if the key comparison result of the fingerprint storage device 35 indicates that the first key K1 is identical with the second key K2. The host 30 encrypts the data D with the registered fingerprint 23, and provides and uploads the encrypted data D to the second host 45 and the cloud 40, respectively. Likewise, a malicious third party is unable to view the content of the encrypted data D at the second host 45 or the cloud 40.

In another embodiment, one of the first controller 31A and the second controller 21B of the fingerprint storage device 35 encrypts the data D with the registered fingerprint 23 if the fingerprint comparison result of the fingerprint storage device 35 indicates that the registered fingerprint 23 is identical with the input fingerprint. Then, the fingerprint storage device 35 provides the encrypted data D to the host 30. The host 30 provides and uploads the encrypted data D to the second host 45 and the cloud 40, respectively. In a further embodiment, one of the first controller 31A and the second controller 21B of the fingerprint storage device 35 encrypts the data D with the registered fingerprint 23 if the fingerprint comparison result of the fingerprint storage device 35 indicates that the registered fingerprint 23 is identical with the input fingerprint and if the key comparison result of the fingerprint storage device 35 indicates that the first key K1 is identical with the second key K2. Then, fingerprint storage device 35 provides the encrypted data D to the host 30. The host 30 provides and uploads the encrypted data D to the second host 45 and the cloud 40, respectively. Likewise, a malicious third party is unable to view the content of the encrypted data D at the second host 45 or the cloud 40.

In some embodiments, when a user who matches the registered fingerprint 23 operates at the second host 45, after a fingerprint comparison procedure and a key comparison procedure, the registered fingerprint 23 is provided to the second host 45. The second host 45 decrypts the encrypted data D with the registered fingerprint 23. By doing so, it is ensured that the content of the encrypted data D can only be viewed by the user who matches the registered fingerprint 23.

Figure 5:
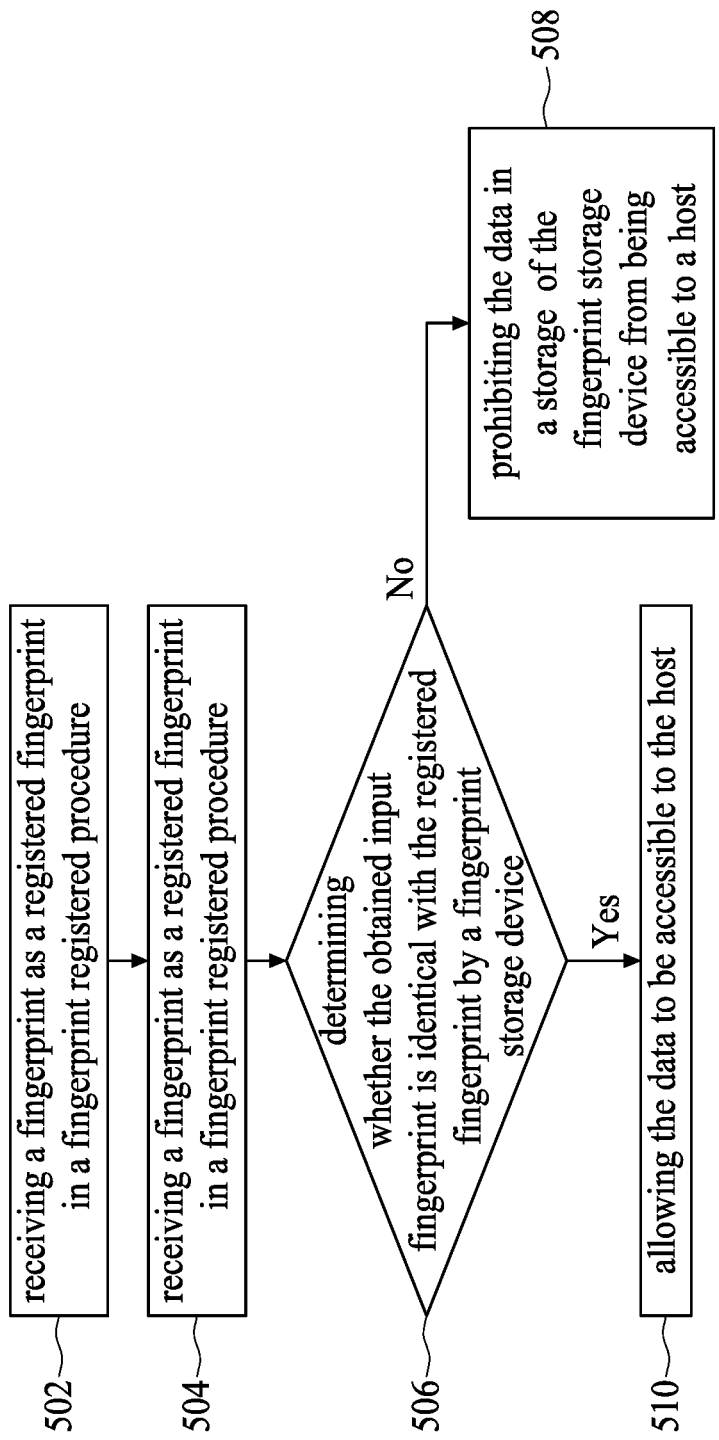
FIG. 5 is a flow diagram illustrating a method for protecting data, in accordance with an exemplary embodiment of the present disclosure.

FIG. 5 is a flow diagram illustrating a method for protecting data, in accordance with an exemplary embodiment of the present disclosure. Referring to FIG. 5, in operation 502, a fingerprint is received and taken as a registered fingerprint in a fingerprint registered procedure. In some embodiments, to register a fingerprint, a fingerprint sensor (such as the fingerprint sensor 28) is used to sense an image of the fingerprint. The image of the fingerprint is received from the fingerprint sensor and is taken as a registered fingerprint.

In operation 504, an input fingerprint is obtained in response to a touch event. In some embodiments, a fingerprint sensor (such as the fingerprint sensor 28) is used to sense an image of a fingerprint in the touch event. The image of the fingerprint is received from the fingerprint sensor and is treated as an input fingerprint.

In operation 506, it is determined whether the obtained input fingerprint is identical with the registered fingerprint by a storage device capable of fingerprint identification (hereafter called "a fingerprint storage device"). If not, in operation 508, data in a storage of the fingerprint storage device is prohibited from being accessible to a host (such as the host 20). If affirmative, in operation 510, the data is allowed to be accessible to the host.

Figure 6:
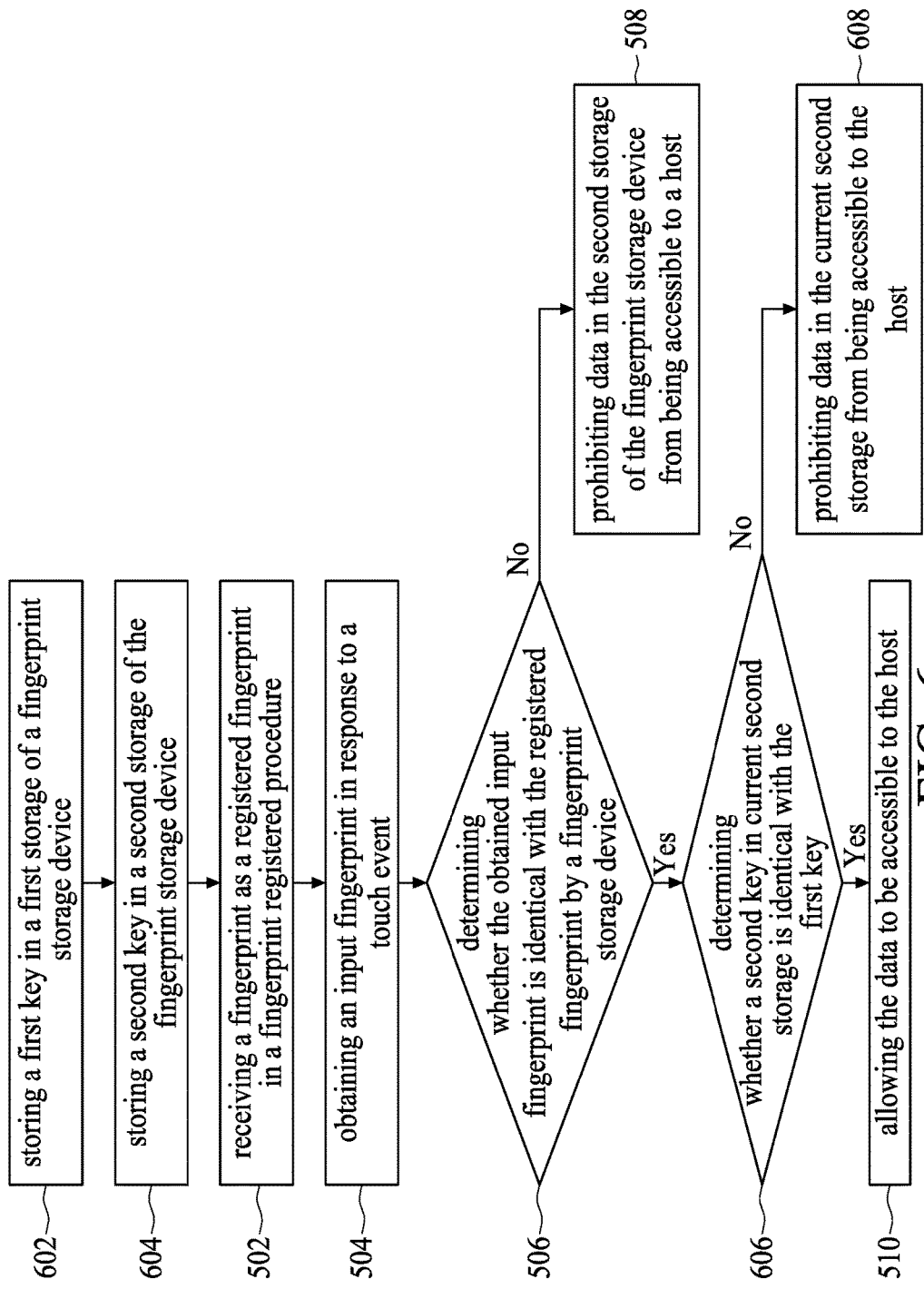
FIG. 6 is a flow diagram illustrating a method for protecting data, in accordance with an exemplary embodiment of the present disclosure.

FIG. 6 is a flow diagram illustrating a method for protecting data, in accordance with an exemplary embodiment of the present disclosure. Referring to FIG. 6, the method for protecting data as shown in FIG. 6 is similar to FIG. 5 except that, for example, the method for protecting data as shown in FIG. 6 further includes operations 602, 604, 606 and 608.

Referring to FIG. 6, in operation 602, also referring to FIG. 3, a first key is stored in a first storage (such as the first storage 32A) of a fingerprint storage device. Moreover, a first key is specific to a certain fingerprint storage device so that different fingerprint storage devices have different first keys.

In operation 604, a second key is stored in a second storage (such as the second storage 32B) of the fingerprint storage device. Moreover, the second key is identical with the first key in a same fingerprint storage device. In addition, the second storage is detachable from the fingerprint storage device.

In operation 506, it is determined whether the obtained input fingerprint is identical with the registered fingerprint by the fingerprint storage device. If not, in operation 508, data in the second storage of the fingerprint storage device is prohibited from being accessible to a host. If affirmative, in operation 606, it is determined whether a second key in current second storage is identical with the first key. If not, in operation 608, data in the current second storage is prohibited from being accessible to the host. If affirmative, ion operation 510, the data is allowed to be accessible to the host.

In some embodiments, operations 602 and 604 are interchangeable in order. Also, operations 502 and 504 are interchangeable in order. Moreover, operations 506 together with 508 and operations 606 together with 608 are interchangeable in order.

Figure 7:
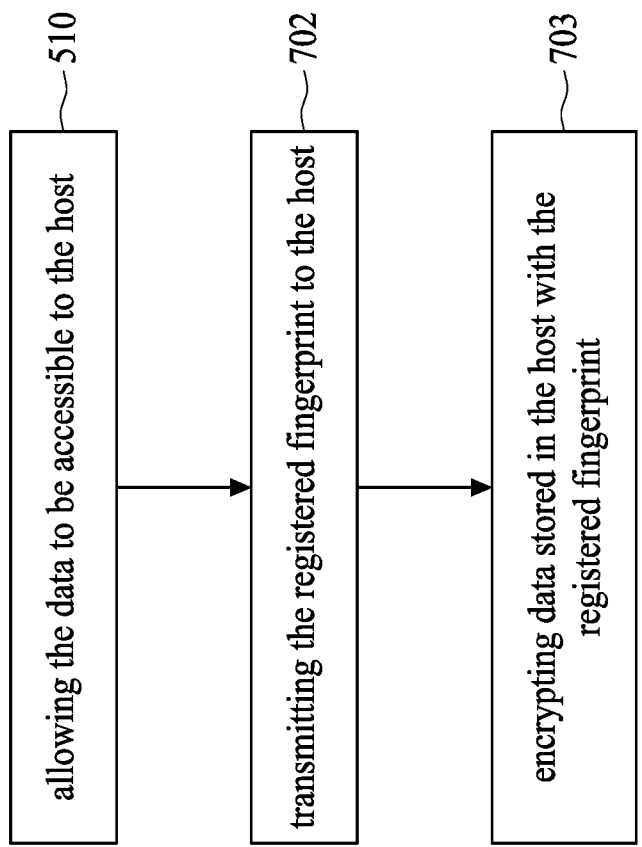
FIG. 7 is a flow diagram illustrating a method for protecting data, in accordance with an exemplary embodiment of the present disclosure.

FIG. 7 is a flow diagram illustrating a method for protecting data, in accordance with an exemplary embodiment of the present disclosure. Referring to FIG. 7, after operation 510 of FIG. 5 or FIG. 6, in operation 702, the registered fingerprint is transmitted to the host. Subsequently, in operation 703, the host encrypts data stored therein with the registered fingerprint. In some embodiments, the host provides or uploads the encrypted data to a second host or a cloud over an internet.

Figure 8:
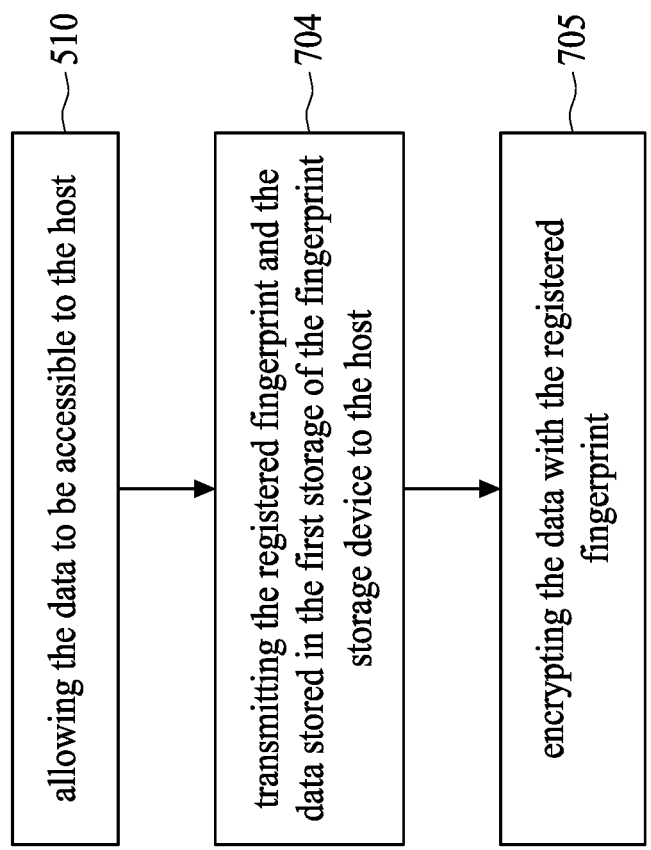
FIG. 8 is a flow diagram illustrating a method for protecting data, in accordance with an exemplary embodiment of the present disclosure.

FIG. 8 is a flow diagram illustrating a method for protecting data, in accordance with an exemplary embodiment of the present disclosure. Referring to FIG. 8, after operation 510 of FIG. 5 or FIG. 6, in operation 704, the registered fingerprint and the data stored in the first storage of the fingerprint storage device are transmitted to the host. Next, in operation 705, the host encrypts the data with the registered fingerprint. In some embodiments, the host provides or uploads the encrypted data to a second host or a cloud over an internet Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements or resources), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for protecting data, comprising:
receiving a fingerprint as a registered fingerprint in a fingerprint registered procedure;
obtaining an input fingerprint in response to a touch event;
determining whether the obtained input fingerprint is identical with the registered fingerprint by a storage device capable of fingerprint identification;
selectively allowing data stored in a second storage of the storage device to be accessible or prohibiting the data from being accessible to a host, which is external to the storage device;
storing a first key in a first storage of the storage device;
storing a second key in the second storage of the storage device;
comparing the first key and the second key by the storage device;
selectively allowing the second storage to provide or prohibiting the second storage from providing the data to the host, in response to a key comparison result;
prohibiting the second storage from providing the data to the host when the key comparison result indicates that the first key is identical with the second key while the fingerprint comparison result indicates that the registered fingerprint is not identical with the input fingerprint.

2. The method of claim 1 further comprising:
comparing the first key and the second key by a second controller of the storage device.

3. The method of claim 1 further comprising:
allowing the second storage to provide the data to the host in response to a key comparison result that the first key is identical with the second key, and in response to a fingerprint comparison result that the registered fingerprint is identical with the input fingerprint.

4. The method of claim 3 further comprising:
providing the registered fingerprint of the first storage to the host; and
encrypting a data with the registered fingerprint.

5. The method of claim 4, wherein the data includes a host data stored in the host.

6. The method of claim 4 further comprising:
providing the data stored in the second storage to the host; and
encrypting a data with the registered fingerprint.

7. The method of claim 3 further comprising:
encrypting the data stored in the second storage with the registered fingerprint to obtain an encrypted data; and
providing the encrypted data to the host.

8. A storage device capable of fingerprint identification, comprising:
a first storage, configured to store a registered fingerprint;
a first controller, configured to compare the registered fingerprint with an input fingerprint, wherein the input fingerprint is obtained in response to a touch event; and
a second storage, configured to store a data, wherein the data is, in response to a fingerprint comparison result, selectively allowed to be accessible or prohibited from being accessible to a host; wherein the first storage is configured to store a first key and the second storage is configured to store a second key, the storage device further comprising:
a second controller, configured to compare the first key of the first storage with the second key of the second storage and, in response to a key comparison result, to selectively allow the second storage to provide or prohibit the second storage from providing the data to the host, wherein when the key comparison result indicates that the first key is identical with the second key while the fingerprint comparison result indicates that the registered fingerprint is not identical with the input fingerprint, the second controller prohibits the second storage from providing the data to the host.

9. The storage device of claim 8, wherein the second controller is configured to allow the second storage to provide the data to the host in response to a key comparison result that the first key is identical with the second key and in response to a fingerprint comparison result that the registered fingerprint is identical with the input fingerprint.

* * * * *